United States Patent [19]

Smith et al.

[11] 3,880,414

[45] Apr. 29, 1975

[54] DUAL INTERLOCKED SAFETY SPRING ASSEMBLY AND METHODS AND MACHINES FOR THE MANUFACTURE THEREOF

[75] Inventors: Woodrow Wilson Smith; Jack Youngquist, both of Coldwater, Mich.

[73] Assignee: Kuhlman Corporation, Troy, Mich.

[22] Filed: Dec. 26, 1973

[21] Appl. No.: 427,495

[52] U.S. Cl. .............................................. 267/168
[51] Int. Cl. ............................................... F16f 3/04
[58] Field of Search .................................. 267/168

[56] References Cited
UNITED STATES PATENTS
973,641   10/1910   Dysart............................... 267/168

FOREIGN PATENTS OR APPLICATIONS
1,519,595   4/1968   France ............................. 267/168

Primary Examiner—James B. Marbert
Attorney, Agent, or Firm—Everett R. Casey

[57] ABSTRACT

A dual interlocked safety spring assembly for minimizing the dangers resulting from spring breakage, in which two or more springs operating primarily in parallel are interlocking along their length so that upon breakage of one of the two springs at a point, the broken spring will interlock with the intact spring and still contribute significantly to the magnitude of the remaining total spring force, and methods and machines for the manufacture of such springs.

18 Claims, 13 Drawing Figures

DUAL INTERLOCKED SAFETY SPRING ASSEMBLY AND METHODS AND MACHINES FOR THE MANUFACTURE THEREOF

SUMMARY OF THE INVENTION

This invention arose in response to the need to reduce the risk that the accelerator-return or "carburetor" spring in an automobile would break and result in a dangerous run-away of the vehicle. Work was done, including work by others, in utilizing two springs which operated independently of each other in parallel, including an arrangement in which a smaller tension coil spring was inserted coaxially within a larger tension coil spring the inner diameter of which was greater than the diameter of the inserted spring. The difficulty of the dual independent spring arrangements was in the magnitude of the change of the resulting force (at any given deflection) which occurred when one of the two springs broke. If each of the two springs was made strong enough to insure that it alone would close the throttle against the friction of the throttle-linkage system, the spring force which the driver had to overcome in operating the accelerator pedal in normal use was excessive. If the force which the driver had to overcome was reduced to a feasible value, then the return force when one spring broke was not adequate to insure full closure of the throttle.

In the present invention, the plural springs are interlockable so that if any one spring breaks at a point, the residual portion or portions of the broken spring will act on and through the intact spring to provide a restoring force substantially exceeding that of the intact spring alone.

DESCRIPTION OF THE DRAWINGS

FIG. 6 is a view of the dual tensioned spring assembly of FIG. 1 with the two springs having been moved in lateral translation, to illustrate the interlocking of the springs;

DESCRIPTION OF THE INVENTION

Figures 1, 2:
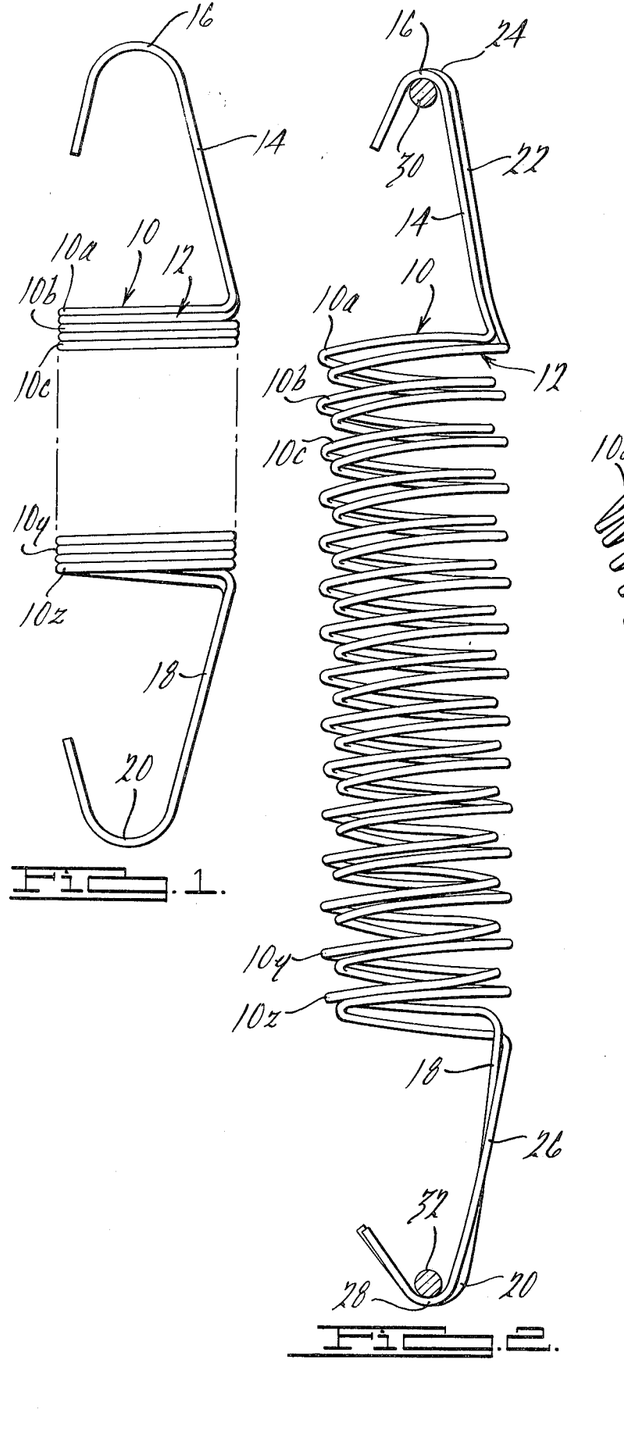
FIG. 1 is an elevational view of a dual tension safety spring assembly embodying certain of the principles of the present invention.
FIG. 2 is a view of the spring assembly of FIG. 1 when that spring assembly is tensioned to an elongated position.

The dual safety spring of FIG. 1 comprises two helical tension springs 10 and 12. Spring 10 includes a body having a plurality of turns $10a, 10b \ldots 10y, 10z$, an upper shank portion 14 terminating in a loop or hook 16, and a lower shank portion 18 terminating in a hook 20. In the illustrated preferred arrangement, the shanks bend from the body at points essentially vertically aligned with one another (at approximately the same location on the circumference on the body of the spring) and those shanks are inclined towards the central longitudinal axis of the body of the spring to center the hooks or loops 16 and 20 approximately along the longitudinal axis of the body of the spring. That arrangement is preferred when the springs are used as tension accelerator-return springs in an automotive throttle system. Spring 12 is similarly provided with a plural turn body, an upper shank 22, an upper hook 24, lower shank 26 and lower hook 28, as may best be seen in the view of FIG. 6 in which the springs are partially separated. The hooks serve as connection means to connect the spring between connecting points in the apparatus.

In the arrangement illustrated in FIG. 1, the body of each spring is essentially in the form of a helix, with the two helixes being substantially coaxial. Further, the two coils are fully interleaved so that the two helixes are non-intersecting and essentially parallel to one another throughout their lengths. As may more clearly be seen in the view of FIG. 2, in which the hook portions of springs 10 and 12 are placed around anchors or connecting points 30 and 32 which are positioned to tension the springs, the turns of one coil do not cross the turns of the other coil but remain substantially parallel thereto. The important matter in the embodiment of FIG. 1 is that the turns of one coil be interleaved and interlocked or interlockable with the turns of the other, which is to say that the two coils cannot be separated by moving them in translation with respect to one another. This is illustrated in FIG. 6 in which the springs 10 and 12 of FIG. 1 have been pulled apart laterally as far as possible and in which each of the individual turns of each of the springs extend through and is locked with a companion or counterpart turn of the other coil. Similarly, two nested springs which are of such different sizes that one can simply be withdrawn from the other by longitudinal translation (that is, in which turns, or portions of turns, of one coil are not in overlying relationship to turns, or portions of turns, of the other coil to prevent separation of the coils by relative translation along the longitudinal axes of the coils) are not interleaved or interlocked as those expressions are used in this document. Springs 10 and 12 in the FIG. 1 construction can be manually separated, (without breaking them) by unscrewing one from the other, that is, by rotating one about its longitudinal axis relative to the other (keeping the loop ends disentangled in the process).

With the springs 10 and 12 under tension (in normal use, to a lesser degree than is illustrated in FIG. 2), the two springs are operating primarily in parallel, and each spring is exerting a force tending to move anchors 30 and 32 towards one another. In the suggested utilization of the systems, one of the connecting means 30 and 32 could be a fixed (or adjustably fixed) anchor in an automobile, and the other could be a point on the carburetor or throttle linkage to cause the spring to urge the throttle to a closed or idle position. Even when both springs are intact, as illustrated in FIG. 2, the total force exerted at given deflection may exceed, to a degree, the sum of the forces of the independent, separated springs, due to rubbing engagement between the two springs and the coefficient of friction between the engaging surfaces, that is, there may be some force-transfer or series-connection effect. However, that factor is not of major importance and may not be of significance in a particular application.

With two conventional paralleled springs, the breaking of one results in a reduction to zero of the force contributed by the broken spring, and the total return spring force drops to that exerted by the remaining spring. However, with the illustrated interlocked springs, breakage of one of the springs at a point in its length results in at least a portion of the broken spring continuing to exert a significant spring force, acting through the remaining intact spring. Thus, if spring 10 in FIG. 2 ruptures at the shank 14, the loop end 16 will likely fall off the anchor 30 (and such is assumed in the illustration) but turn 10a interlocks with the uppermost turn of coil 12 and the other turns of spring 10 are, in the illustrated arrangement, correspondingly interlocking or interlockable with turns of coil 12. As a result, the remaining major portion of spring 10 remains under substantial tension and is still exerting a meaningful force as an element of the total force operating between anchors or connecting points 30 and 32. The remaining portion of spring 10 is now operating effectively in series with at least the upper turn and shank 22 of spring 12 and, to a degree, the frictional engagement between the other interlocked turns can be viewed as a complex series-parallel relationship. As illustrated, the severed spring tends to kick out laterally as a result of the severing or breaking, to establish the requisite interlocking contact, but the relative lateral movement terminates, at the remaining upper turn, when the interlocking contact occurs.

Figure 4:
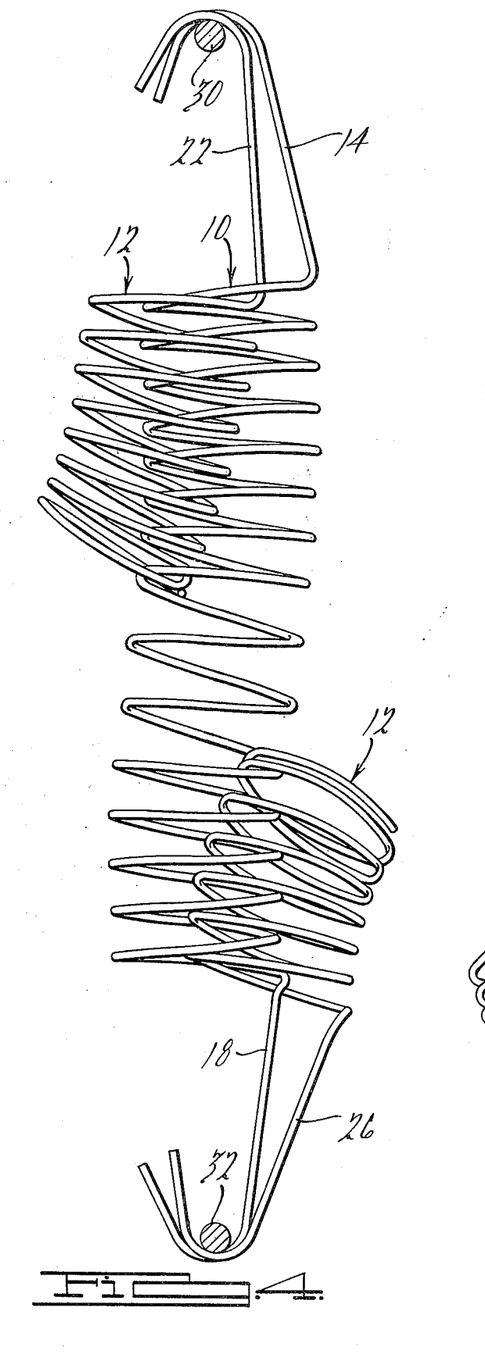
FIG. 4 is a view of the tensioned spring assembly of FIG. 2 with one of the two springs broken in the body of the spring, illustrating the interlocking of the springs.

FIG. 4 is a pictorial representation of the FIG. 2 springs if one of the two springs is broken approximately at the middle turn of the coil. Thus, when spring 12 was cut at about its center, in a tested unit, the severed portions tended to deflect laterally and to separate along the intact coil to some extent. But the remaining severed portions of spring 12, now operating in series with portions of spring 10, are still tensioned and are still contributing a return force, for safety. It is theorized that after rupturing of the nature of that illustrated in FIG. 4, the ruptured spring tends to unwind in response to the tensioning forces and that it is the coefficient of friction and force of engagement between the interlocked turns which controls the extent of unwinding and hence the magnitude of the increase of rate over that of the residual intact spring alone.

It is intended of course that if either coil breaks, the entire assembly be promptly replaced, for safety. However, there are circumstances in which an effective return force would still be obtained even in the wholly remote event that both springs broke. Thus, in FIG. 5, both springs 10 and 12 were severed in their body portions, and the illustration depicts how the interlocking and intertangling of the turns results in a continuing application of a restoring force. That force is less than that exerted under the circumstance of FIG. 4., but far greater than if the two non-interlocking parallel springs both broke in their body portions, for in that case the restoring force would drop to zero.

As above noted, the important factor is that the turns be interlockable so that upon rupture of one spring, the two springs cannot merely separate in translation and so that the ruptured spring will continue to exert a meaningful restoring force, acting through its mate. For that purpose, it is clear that the springs do not have to be made of round wire, and do not have to be of wire having identical shapes or sizes or other characteristics. Further the hook ends need not be exactly parallel, but may be crossed over in assembly without impairing the functioning of the unit, as is illustrated in certain of the drawings. Further, the coil springs do not have to be truly "helical" in the narrow sense, in that they do not have to have a uniform pitch or precisely the same pitch as long as there is adequate interlocking. Similarly, they do not have to be precisely helical in the narrow sense, in that the coils could be tapered, barrel shaped, hour glass shaped, or otherwise, and both need not be identical. It will be apparent that while two springs should provide all of the additional factors of safety reasonably required, three or more mutually interlocked springs could be employed if desired.

While the numbers will vary widely in accordance with the character of the springs, examples of tested units, illustrating the above-described synergistic action will be given. In one test of groups of pairs of springs for use on a certain type of automobile, the maximum return force for the two interlocked springs, with both intact, was about 5.2 pounds. When one of the coils in each pair was severed, the force at that deflection did not drop in half, but rather reduced between one-half of a pound and one pound.

In another test a dual interlocked spring of the type shown in FIG. 1 was extended 0.650 inches from its free length, requiring a force of three pounds to do so. One spring was then cut about in the middle of the body (correlative to the FIG. 4 showing). The force exerted by the interlocked spring combination, at that deflection, dropped but one ounce. As a test, the upper half of the severed spring was then unscrewed from the intact coil and discarded. The force required to deflect the remaining assembly the above amount was one pound fifteen ounces. The remainder of the severed spring was then removed and discarded. The force to deflect the single intact spring 0.650 inches was one pound seven and one-half ounces.

As another test, a different dual interlocked spring assembly was extended to a seven inch length, requiring a force 0f 3¾ pounds to do so. One spring was then severed at the hook (correlatively to the illustration of FIG. 3). The same deflection required a force of three pounds.

Figure 3:
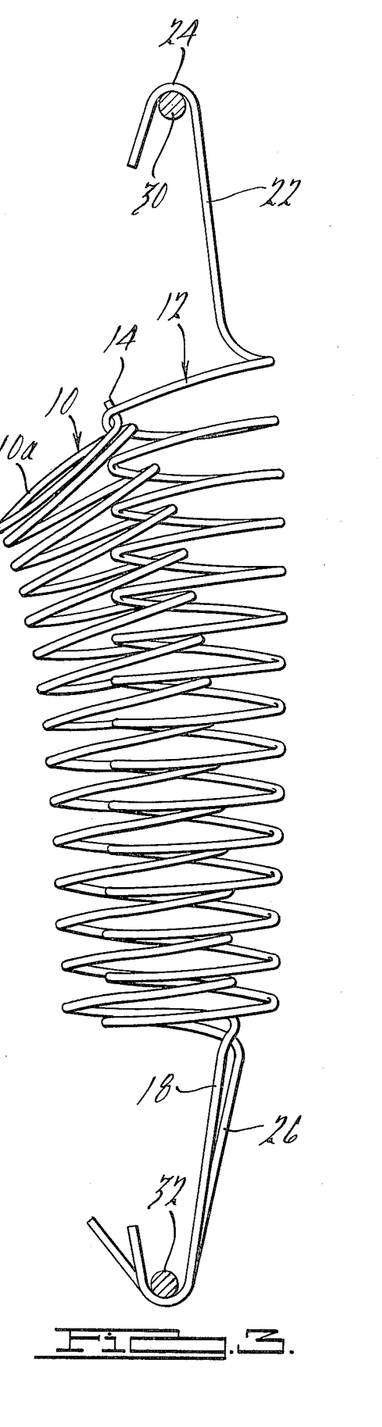
FIG. 3. is a view of the tensioned spring assembly of FIG. 2 with one of the two springs broken in the hook-length shank, illustrating the interlocking of the springs.

It will be observed that when both of the springs 10 and 12 are intact and under tension, as illustrated in FIG. 2, the two springs are acting primarily in parallel between the connecting points 30 and 32, any series effect resulting from the scrubbing engagement between adjacent turns of the two springs being of minor significance. The rate of each of the springs is selected so that their combined rate will be that desired in the ultimate utilization. For example, if the dual safety spring is utilized as an accelerator return spring for an automobile, the rate of the combination or system of springs 10 and 12 is selected to give the desired return force on the accelerator pedal during the period that both springs are intact. If spring 10 breaks in a shank, as illustrated in FIG. 3, an interlocking engagement occurs between turns at the upper end of spring 10 and turns of spring 12, the primary interengagement, in the illustrated arrangement, occurring between the first and second turns at the upper end of spring 10 and the upper turn of spring 12. As a result, the lower portion of spring 10 continues to operate primarily in parallel with the lower portion of spring 12, but spring 10 is also acting effectively in series with at least a portion of spring 12, and particularly, with the upper portion including the upper turn and shank of spring 12. The rate of the resulting FIG. 3 system is, of course, much greater than the rate of the intact spring 12, alone.

Similarly, if spring 12 breaks in the middle, as is illustrated in FIG. 4 of the drawings, the lowermost turn or turns of the upper section of spring 12 establish a locking interengagement with adjacent turns of the spring 10 so that while the upper portion of spring 12 is operating effectively in parallel with the upper portion of spring 10, it is also acting in series, by virtue of the new locking interengagement, effective in response to the breaking, with the center and lower portion of spring 10. The reverse is, of course, true as to the ruptured lower portion of spring 12.

Figure 5:
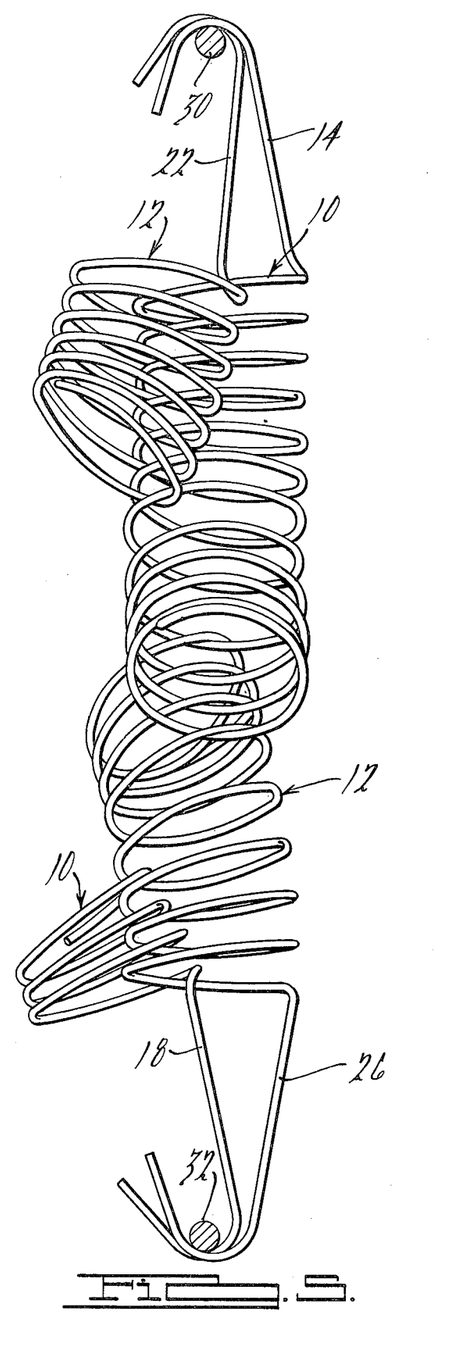
FIG. 5 is a view of the tensioned spring assembly of FIG. 2 with both of the springs broken at different points in their bodies.

In the more complex circumstance in which both springs rupture in their bodies, as illustrated in FIG. 5, it will be seen that the upper portion of spring 12 effectively acts in parallel with the upper portion of spring 10, but also acts effectively in series with the lower portion of the upper half of ruptured spring 10, and with the lower half of spring 12, and the lower portion of spring 10 is acting effectively in parallel with the lower portion of spring 12 but is effectively acting in series with the upper portion of the bottom broken part of spring 12 as well as in series with the remainder of itself, including shank 14. Thus, while the two springs tend to operate primarily independently and in parallel when they are both intact, and while they are in interlocked or interlockable condition, prepared for actual interlocking engagement upon the rupture of either, it is only upon the rupture of the spring that the actual forceful engagement occurs which converts at least a portion of the broken spring into series relationship with at least a portion of the intact spring to insure that the rate of the system will not reduce to the rate of the remaining intact spring upon rupture or breakage of one of the springs.

Figure 7:
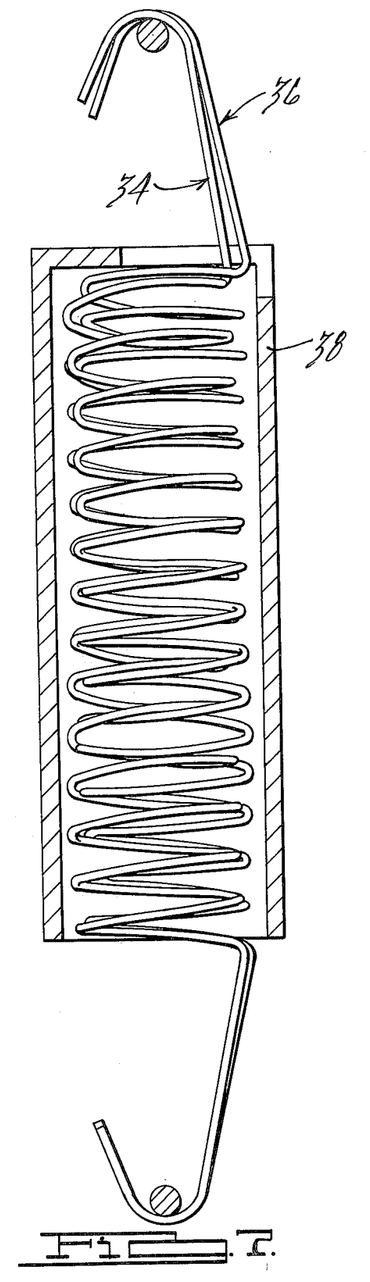
FIG. 7 is an elevational view, in cross section, of another form of spring assembly embodying certain of the principles of the present invention.
Figure 8:
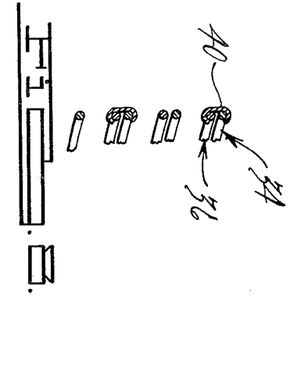
FIG. 8 is a fragmentary elevational view, in cross section, of another form of spring assembly embodying certain of the principles of the present invention.

The dual interlocked spring of FIG. 1 can be manufactured by forming the two springs independently, aligning them end to end, and then screwing them together, although a better method is described hereinafter. If, however, two separate coil springs are manufactured and then interassembled by aligning them vertically side by side and then forcing them together in lateral translation, interdigitating the turns, a spring of the nature of that illustrated in FIG. 7 will result. A close study of springs thus assembled, particularly if they are not under tension, will show that each turn of one appears to cross a corresponding turn of the other at two points in each turn. Yet the two springs are not interlocked, as that term is used herein, since the two springs can again be pulled apart in lateral translation, or, more importantly, they will tend to separate laterally if one is broken while the springs are under tension, so that the broken spring will not contribute meaningfully, if at all, to the total spring force. FIG. 7 illustrates how two springs 34 and 36 thus assembled can nonetheless be forced to act as safety springs by inserting them within a tubular retainer or sleeve 38 extending over a major portion of the lengths of the springs and having an innerdiameter substantially less than the sum of the outer diameters of the two springs 34 and 36. The retainer or sleeve 38 prevents the lateral separation of the springs which would otherwise occur if one thereof broke while the assembly was under tension. In that manner, the two springs can be forced to remain somewhat entangled so that the spring rate does not drop in half if one of the springs breaks. A similar result can be achieved by applying short clips 40 to adjacent turns of the two springs 34 and 36 at selected points in their bodies, as is illustrated in FIG. 8. However, the interlocked arrangement of FIG. 1 is preferred.

Figure 9:
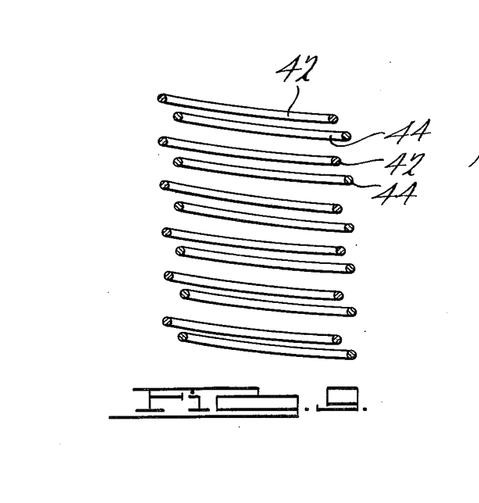
FIG. 9 is an elevational view of a dual compression spring.

Tests have shown that improved safety also accrues when the interlocking turn concept is applied to compression coil springs. As is illustrated in FIG. 9, two helical compression coil springs 42 and 44 (shown offset for clarity) are formed with substantially identical diameters, so that they cannot be separated in vertical translation, and are interwound so that their turns will interlock upon lateral displacement resulting, for example, from rupture of one of the springs. The compression coil spring of FIG. 9 can be made in accordance with the teachings of FIGS. 10 and 11, by adjusting the pitch. While some improvement in safety can be effected with compression springs, the primary principles of the invention are directed to tension springs such as those of FIG. 1.

Figure 10:
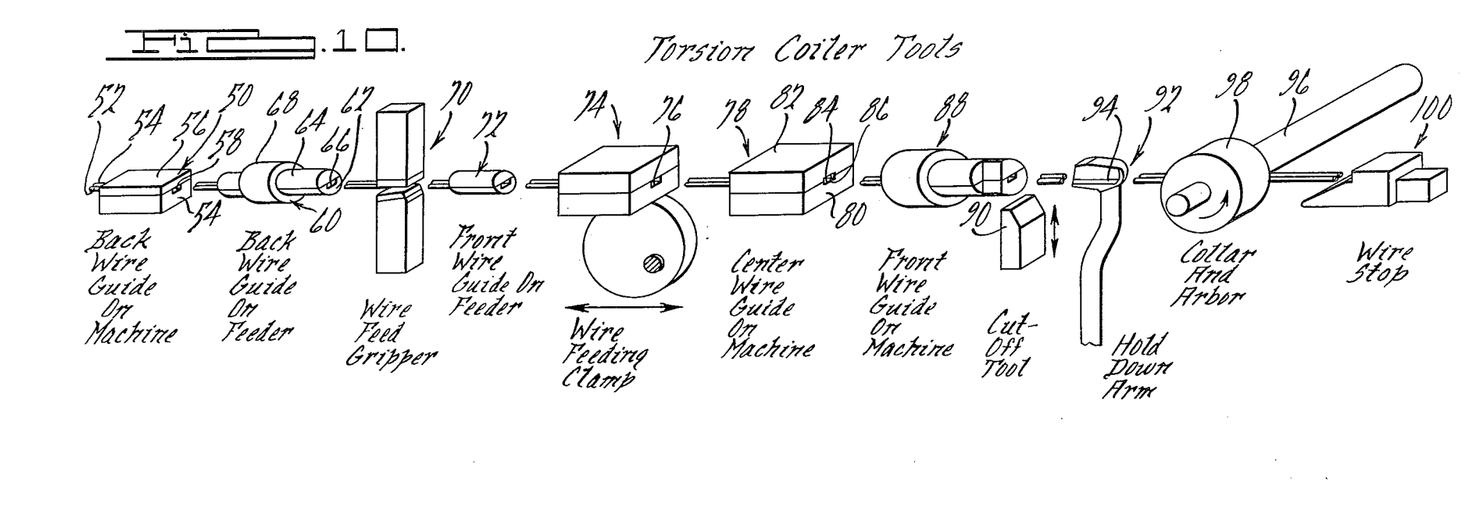
FIG. 10 is a schematic representation of one form of suitable machine for forming the dual safety springs of FIG. 1.

The manufacture of the interlocked dual springs using a modified conventional torsion coiler is illustrated in FIG. 10 of the drawings. Since the principles of conventional forms of such coilers are well known, the representation is schematic in order to best teach the modifications to those skilled in the art. It will be appreciated that any given coiler may have fewer or more elements, including fewer or more guide elements, and that the attitude or orientation of the various parts may be varied.

The back wire guide 50 on the machine, which receives the two wires 52 and 54 from the source, comprises a base portion 54 and a cap portion 56, one of which (representatively the base) is grooved at 58 to a depth of about one diameter of each of the wires 52–54 and to a width of about two wire diameters, the dimensions being selected to position the two wires in horizontal (in the illustrated arrangement) coplanarity and in abutting, or substantially abutting, side-by-side relationship. The groove 58 is preferably formed by milling or the like. It could be formed as a double cylindrical hole in a solid block 54–56 by drilling or the like, but the splitting of the block and the grooving of one or two surfaces thereof is preferred. The two parts 54–56 of the guide are clamped, bolted or otherwise secured together in any suitable manner.

The back wire guide 60 on the feeder is illustrated as being of a different construction, to teach that alternative. A round rod is longitudinally split (or the two portions are otherwise formed) to form halves 62 and 64, one of which is grooved at 66 pursuant to the foregoing teachings. The portion 62 and 64 are then held together by a tightly fitting sleeve 68.

The wire feed gripper 70 is conventional, and serves as a one-way dog to freely permit the wires to travel to the right (in the view of FIG. 10) but to prevent retrograde movement of those wires.

Front wire guide 72 on the feeder does or may correspond to guide 60.

The wire feeding clamp assembly 74 serves the function of selectively grasping the pair of wires, advancing them to the right (in the view of FIG. 10) a selected or preselected distance, then releasing the wires and translating back to the left in preparation for regrasping, to advance another length thereof. It is conventional except for the modification of the forming of a groove therein of the dimensions above discussed, as is illustrated at 76.

Center wire guide 78 on the machine may be correlative to the other guides hereinbefore discussed. However, for purposes of illustration, it is shown as consisting of two portions 80 and 82, with portion 80 being provided with a groove 84 about one-half of a wire diameter in one dimension and about two wire diameters in the other dimension, and with plate 82 being provided with a corresponding groove 86. The two plates 80 and 82 are held together in any suitable fashion, with grooves 84 and 86 in registration. It will be perceived that the dimension of the grooves could be reversed, rotating the portions 80 and 82 ninety degrees if desired.

Front wire guide 88 on the machine is or may be correlative to guide 60, above described, except that it is designed to cooperate, as a shearing element, with the cutoff tool 90, to sever the wires.

Hold down arm 92 is a wire positioning device. It is provided with a guiding groove 94 which is illustrated to be semi-circular in cross section, although it is again contemplated that it may be rectangular in cross section if desired. The hold down is representative of a final means (which may take the form of the front wire guide 88 instead, if it is adequately close to the arbor 96) for keeping the wires closely together against any tendency (which tends to exist) for the wires to separate as they approach the coiling arbor 96. With significant distances between the arbor 96 and the front wire guide 88, hold down arm 92 also helps to keep the reach of wires between those elements from bowing under the torque applied thereto by the arbor 96 during the coiling operation. The distance between the cutoff tool 90 and the arbor 96 is selected in accordance with the trailing hook-wire length, and with short hook-wire lengths, the front wire guide 88 may be close enough to the arbor 96 to effectively perform the functions of the hold down arm 92.

The assembly including arbor 96 and collar 98 is a conventional tool on a torsion coiler and is modified only in configuring the jaw or slot or grasping portion (normally on the collar 98) to permit it to accommodate and hold the double wires, in accordance with the above-discussed principles.

Wire stop 100 is set to be engaged by the ends of the wires during infeed, to control, by its relation to arbor 96, the leading-end hook-wire length.

In use, the wire feeding clamp 74, in a retracted (leftward) position, clamps to the pair of wires, pulling trailing portions of those wires through the elements 50, 60, 70 and 72 and pushing leading portions of those wires through elements 78, 88 and 92, through the wire slot in collar 98 and into abutment with wire stop 100. It then unclamps to free the wires for further travel (in a rightward sense in FIG. 10).

The arbor 96 then rotates about its longitudinal axis and translates generally toward the reader (in the illustrated view) along its longitudinal axis, to form the double wound single layer coil or array thereon, that arbor pulling wire from the source and through elements 50, 60, 70, 72, 78, 88 and 92 in the process. At the end of the coiling, the cutoff tool 90 is actuated to sever the wires at the proper trailing-end hookwire length. The spring is removed and the operation is repeated. The ends of the dual springs may then be looped as described hereinafter.

Figure 11:
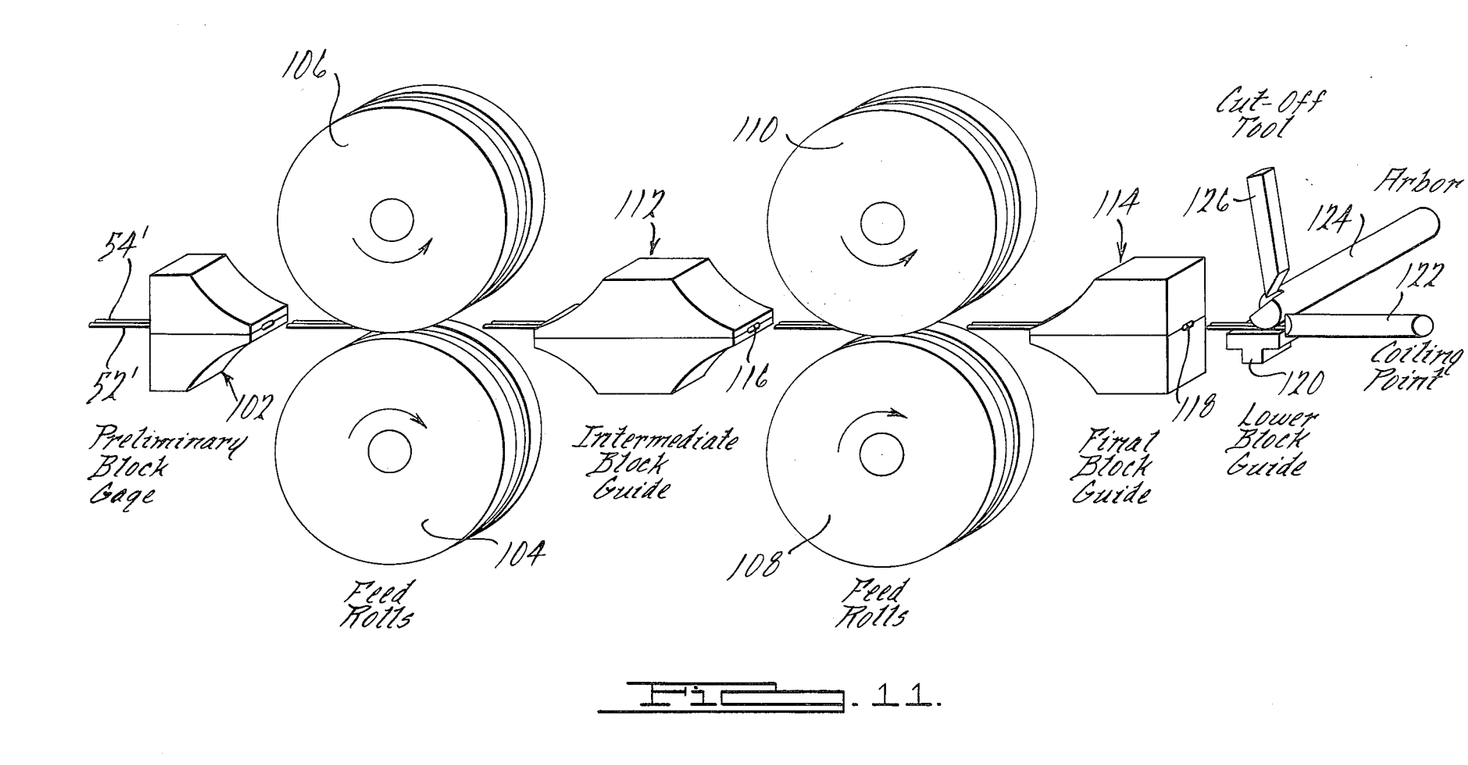
FIG. 11 is a schematic representation of another form of suitable machine performing the dual safety springs of FIG. 1.

The manufacture of the dual springs using a modified automatic coiler, to illustrate another one of the possible ways to manufacture the dual springs, is illustrated in FIG. 11 of the drawings. Since the principles of such coilers are well known, the representation is schematic in order to best teach the modifications to those skilled in the art. Again, fewer or more elements may be employed in any given machine.

The two wires 52' and 54' are fed from a source through a preliminary block guide 102. To illustrate another mode of modifying a wire guide, in this case the normal guide is effectively slit lengthwise (or made from two parts) and a mating groove is formed in each of those faces. In the illustrated arrangement, each groove is about one-half of a wire diameter high and about two wire diameters wide with the longitudinal edges of each group curved to about the radius of the wire. The two parts are then secured together in any suitable manner, with the groove halves in registration.

Feed rolls 104 and 106, as well as feed rolls 108 and 110, drive the wires. Their surfaces may be grooved or notched to serve as circumferential guiding means to guide the dual wires and hold them accurately in their proper interrelationship, as is illustrated by the grooved surfaces of each of those feed rolls.

An intermediate block guide 112 is or may be situated between the sets of feed rollers, and a final block guide 114 is situated at the outfeed end of rolls 108-110. Each such block guide is or may have its respective groove 116 or 118 conformed in any of the ways previously described.

The feed rolls feed the two wires together through the final block guide 114 and through the lower block guide 120 to the coiling point 122 which concurrently forms the wires into the double wound single layer coils about arbor 124. The lower block guide 120 (and the coiling point if desired) is again grooved and conformed in accordance with the foregoing teachings to accommodate the dual paralleled wires and retain them in their desired coplanar abutting or essentially abutting relationship. It will be appreciated, of course, that the two wires may be either maintained essentially in abutment during coiling, or they may be in spaced parallelism at the coiling point, particularly if the springs are to have a pitch greater than the wire diameters.

After the feed rolls have driven an adequate length of wire through the coiling point, the coil is severed with the cutoff tool 126. It will also be appreciated that in accordance with the well known practices in the art, the feeding and cutting may be performed to provide leading and trailing hook-wire lengths. Assuming the latter has been done, the four ends of the wires are then looped.

Whether the wires are coiled by the coiler of FIG. 10 or the coiler of FIG. 11, or otherwise, it is preferred that the two hook-wires at one end of the preferred spring assembly extend, prior to any looping operation, in substantial parallelism with each other, away from the coil, substantially in the plane of the final turn at that end, and be generally tangential to the mean diameter of the coil at a point in the circumference of the coil. The two hook-wires at the other end may be similarly characterized, and it is preferred that the point of their general tangency to the mean diameter of the coil be aligned, or nearly so, with the point of general tangency of the hook wires at the other end. Otherwise stated, it is preferred that the four hook-wire ends, before looping, lie substantially in a common plane.

Figure 12A:
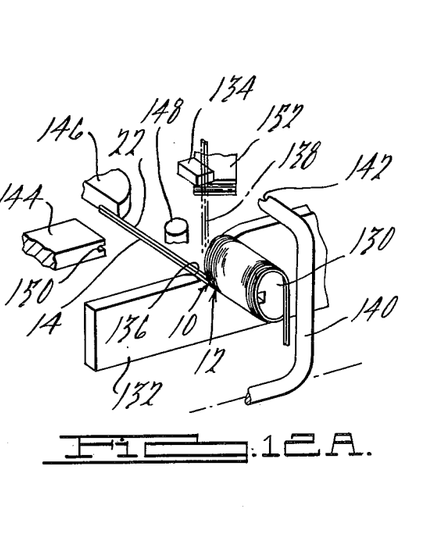
FIGS. 12A and B are schematic representations of a portion of a machine for forming the loop ends of the dual safety spring of FIG. 1.
Figure 12B:
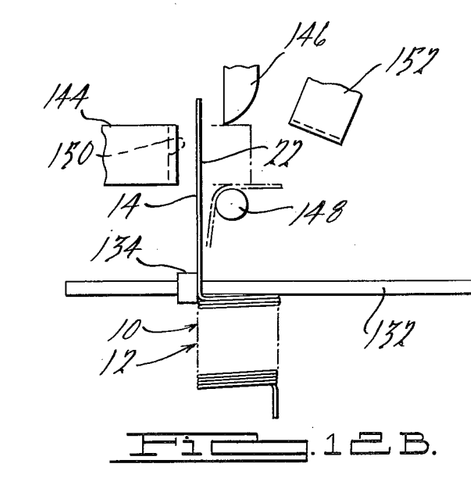

For their representative use as a dual accelerator return spring, the dual spring ends are looped, as previously noted. A suitable looper mechanism is schematically represented in FIGS. 12A and B of the drawings.

In the use of that apparatus, the wound double coil spring is positioned on a plug 130 which is mounted on a radius bar 132, the outer diameter of the plug preferably being but enough smaller than the inner diameter of the coil to permit manual insertion of the coil on the plug. The dual coil 10-12 is clamped to the plug in any suitable manner (as by the use of clamping jaws, not shown) with the projecting ends 14 and 22 of the coil positioned against a positioning stop 134 which is located to position the ends 14 and 22 in a position substantially perpendicular to a radiused bending surface 136 on radius bar 132, in the position illustrated in phantom at 138. Bending surface 136 is desirably positioned in a line intersecting the longitudinal axis of the plug 130.

A throw-down arm 140 is then actuated to exert a force tending to rotate the pair of ends 14-22 in their plane but away from the body of the coil 10-12, so as to bend both of the ends over the radiused bending surface 136. The engaging end of the throw-down arm is preferably provided with a positioning notch 142 for accepting both of the wire ends and holding them in their abutting, aligned position during the bending.

The throw-down arm 140 deflects the projecting ends sufficiently more than ninety degrees so that upon release thereof, the wire ends will spring back to a position which is about at right angles to the end turn of the coil. In a typical practice, this required a total bending of about 135°. As noted, the wire shanks adjacent the body of the coil, drsirably extend at an angle to the longitudinal axis of the coil (and in a diametric plane of the coil) to position the hooks approximately at the longitudinal centerline of the coil, as may be accomplished by controlling the course of movement of the throw-down arm, or by subsequent operations.

The throw-down arm 140 is then retracted, and a forming tool 144 is translated from left to right (in the view of FIGS. 12A and 12B). This performs two functions. First, tool 144 cooperates with surface 146 to shear the ends 22-14 to correct length. Secondly, continued translation of tool 144 bends both of the ends partly around arbor 148, to a generally right angled bend. The engaging end of tool 144 is preferably provided with a notch 150 two wire diameters wide (with a chamfered entry) to hold the wire ends in proper interrelationship during the noted operations.

Thereafter, forming tool 152 is advanced in a path to engage the right-angle deflected remote ends of the wires and to further bend them about the arbor 148, the stroke of tool 144 terminating short of the path of movement of tool 152. Again, the end of tool 152 is or may be notched or slotted to hold the wires in proper abutting interrelationship. The path and stroke of tool 152 are selected to provide the requisite overbending. The extent of the preferred final bending of the ends is illustrated in FIG. 1.

It will be appreciated that in each case in which overbending has been discussed above, the degree of bending may be less if the wires are coiled in an annealed state for later tempering.

The tools 144 and 152 are then restored to position, the clamps removed, and the dual coil reversed end for end, reinserted on the plug 130 and the operation is repeated.

What is claimed is:

1. A dual safety tension spring for association with two connecting points in an apparatus for exerting tension forces therebetween, comprising first and second spring coils each having a plurality of turns, each of certain of said plurality of turns of said first coil being in non-intersecting substantial parallelism with a pair of adjacent turns of said second coil and disposed therebetween, and connection means at each end of one of said coils for connecting said coil to the connecting points.

2. The combination of claim 1 in which said connection means is a shank integral with said coil and a hook integral with said shank.

3. The combination of claim 1 further including connection means at each end of the other one of said coils for connecting said other one of said coils to the connecting points.

4. The combination of claim 3 in which each of said connection means is a shank integral with said coil and a hook integral with said shank at each end of each said coil, and in which the two hooks at one end are connectable with one connecting point and in which the two hooks at the other end are connectable with the other connecting point.

5. The combination of claim 4 in which said hooks at each end are substantially parallel.

6. The combination of claim 1 in which each of said coils is generally circular cylindrical, in which said coils are substantially coaxial, and in which said first and second coils are substantially of the same diameter.

7. The combination of claim 6 in which the outer diameter of each of the coils is greater than the inner diameter of the other one of the coils.

8. The combination of claim 7 in which upon rupture of either of said springs, movement of at least a portion of said ruptured spring in translation along the longitudinal axis of said coils is terminated by interlocking engagement between portions of said portion of said ruptured spring and portions of the other spring.

9. A dual safety tension spring for association with two connecting points in an apparatus for exerting tension forces therebetween comprising first and second generally circular spring coils, each having a plurality of turns, at least portions of certain of the turns of one of the coils overlying at least portions of certain of the turns of the other one of the coils for preventing separation of said coils by relative translation along the longitudinal axes of said coils during tensioning, at least substantial portions of at least certain of said turns of each of said coils being spaced from the turns of the other one of said coils when said dual safety spring is tensioned between the connecting points, each of at least certain of said turns of each of said coils being interlocked with a turn of the other one of said coils for preventing full separation of said coils by relative translation in a direction lateral to the longitudinal axes of said coils, and connection means for connecting said coils to the connecting points.

10. The combination of claim 9 in which said coils are generally cylindrical and substantially coaxial and of substantially the same diameter.

11. The combination of claim 10 in which the outer diameter of each of the coils is greater than the inner diameter of the other one of the coils.

12. The combination of claim 10 in which upon rupture of either of said springs movement of at least a portion of said ruptured spring in translation along the longitudinal axes of said coils is terminated by interlocking engagement between portions of said portion of said ruptured spring and portions of the other spring.

13. A dual safety tension spring for association with two connecting points in an apparatus for exerting tension forces therebetween comprising first and second generally circular coil springs each having a plurality of turns, at least portions of certain of the turns of one of the coils overlying at least portions of certain of the turns of the other one of the coils for preventing separation of said coils by relative translation along the longitudinal axes of said coils during tensioning, the turns of each of said coils being in non-interlocked relation with the turns of the other one of said coils for permitting separation of said coils by relative translation lateral to the longitudinal axes of said coils, and a plurality of clips securing portions of each of certain of the turns of one of the coils to adjacent portions of each of certain of the turns of the other one of said coils for preventing separation of said coils by relative translation lateral to the longitudinal axes of said coils.

14. A dual safety tension spring for association with two connecting points in an apparatus for exerting tension forces therebetween comprising first and second generally circular coil springs each having a plurality of turns, at least portions of certain of the turns of one of the coils overlying at least portions of certain of the turns of the other one of the coils for preventing separation of said coils by relative translation along the longitudinal axes of said coils during tensioning, the turns of each of said coils being in noninterlocked relation with the turns of the other one of said coils for permitting separation of said coils by relative translation lateral to the longitudinal axes of said coils, and a tubular sleeve surrounding said coils over a major portion of their lengths and having an inner diameter substantially less than the sum of the outer diameters of said coils for preventing separation of said coils by relative translation lateral to the longitudinal axes of said coils.

15. A dual safety compression spring for association with two connecting points in an apparatus for exerting compression forces therebetween comprising first and second generally annular spring coils each having a plurality of turns, at least portions of certain of the turns of one of the coils overlying at least portions of certain of the turns of the other one of the coils for preventing separation of said coils by relative translation along the longitudinal axes of said coils during compression, at least substantial portions of at least certain of said turns of each of said coils being spaced from the turns of the other ones of said coils when said dual safety spring is compressed between the connecting points, each of at least certain of said turns of each of said coils being interlocked with a turn of the other one of said coils for preventing full separation of said coils by relative translation in a direction lateral to the longitudinal axes of said coils.

16. A dual safety spring system for exerting a tension force between connecting points in an apparatus at a preselected rate comprising a first tension spring having a plurality of turns and exerting a tension force at a first rate between the connecting points, a second tension spring having a plurality of turns and exerting a tension force at a second rate between the connecting points and acting primarily in parallel with said first tension spring when both springs are intact, said springs conjointly exerting a tension force between the connecting points at said preselected rate, and means effective upon breakage of either of said springs for maintaining the tension force between the connecting points at a rate greater than each of said first and second rates comprising means for selectively connecting at least a portion of the broken spring in tension force exerting relationship with at least a portion of the intact spring, said means comprising a locking interengagement between at least one of the turns near the break in the broken spring and at least one of the turns of the intact spring, said locking interengagement becoming effective upon the breakage of the spring.

17. The combination of claim 16 in which said locking interengagement connects at least a portion of the broken spring effectively in series with a portion of the intact spring and effectively in parallel with another portion of the intact spring.

18. A dual safety tension spring in association with two connecting points in an apparatus comprising first and second generally circular spring coils, each having a plurality of turns, at least substantial portions of at least certain of said turns of each of said coils being spaced from the turns of the other one of said coils when said dual safety spring is tensioned between the connecting points, each of at least certain of said turns of each of said coils being interlocked with a turn individual thereto of the other one of said coils and preventing full separation of said coils by relative translation in a direction lateral to the longitudinal axes of said coils, and connection means for connecting said coils to the connecting points.

* * * * *